Nov. 6, 1928.
A. R. RIDDERSTROM
SKIVING MACHINE
Filed Jan. 4, 1924
1,690,595
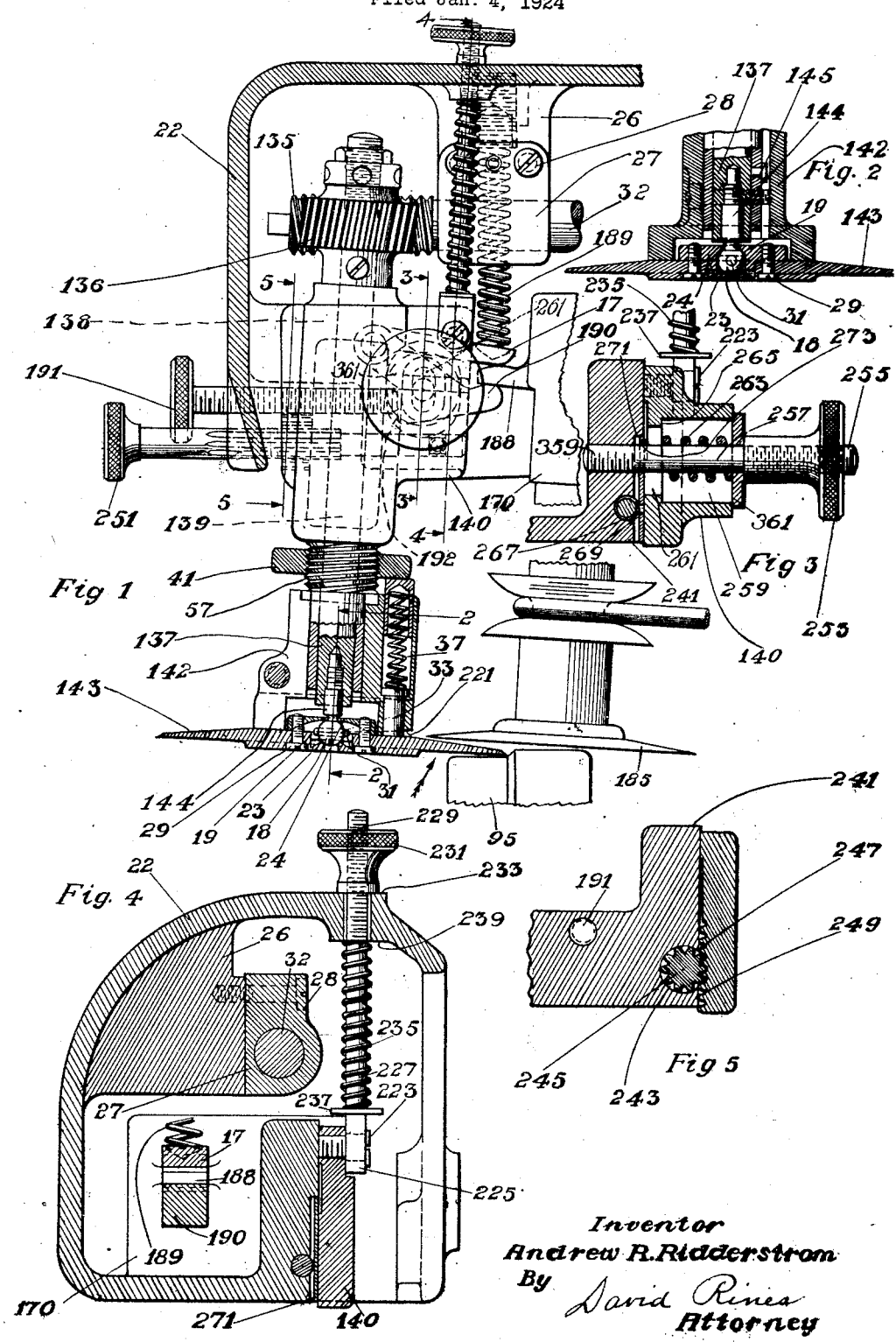
Inventor
Andrew R. Ridderstrom
By David Rines
Attorney Patented Nov. 6, 1928.

1,690,595

UNITED STATES PATENT OFFICE.

ANDREW R. RIDDERSTROM, OF NAHANT, MASSACHUSETTS, ASSIGNOR TO BEACON FOLDING MACHINE COMPANY, OF LYNN, MASSACHUSETTS, A CORPORATION OF MASSACHUSETTS.

SKIVING MACHINE.

Application filed January 4, 1924. Serial No. 684,437.

The present invention relates to skiving machines, and more particularly to machines in which a shoe upper or other sheet material is advanced by a feed roll and a feed disk to a rotating skiving knife which cuts a scarf in the margin of the material.

The chief object of the invention is to provide a novel adjustment for the feed disk. Other and further objects will appear hereinafter.

In the accompanying drawings, Fig. 1 is a longitudinal, central, vertical section of a portion of a machine constructed according to a preferred embodiment of the present invention; and Figs 2, 3, 4 and 5 are sections taken upon the lines 2—2, 3—3, 4—4 and 5—5, respectively, of Fig. 1, looking in the direction of the arrows.

The invention is for illustrative purposes shown in the accompanying drawings as embodied in a machine having many features in common with a machine constituting the subject-matter of a copending application, Serial No. 521,239, filed December 9, 1921. The frame of the machine is provided with an overhanging arm or head 22 that carries a skiving knife 185 and a feed disk 143. The feed disk cooperates with a feed roll 95 to feed material to the knife. A projection or lug 26, provided with a main bearing 27, is fastened to the front end of the head 22 by screws 28. A shaft 32 is journaled in the bearing 27. The feed roll and the feed disk are driven from the shaft 32, as is explained more fully in the above-identified application. The feed-roll driving mechanism is not illustrated herein. The feed disk is driven from a worm 135 that is secured to the shaft 32 and that meshes with a worm gear 136 that is keyed or bolted to the upper end of the feed-disk shaft 137. The shaft 137 is journaled at 138 and 139 in an adjustable bearing 140. The feed disk 143 normally presents an angular working relation with respect to the feed roll 95, and the driving gearing is such that both axial and transverse movement may be had between the gears without disengagement thereof, either for adjustments or when performing work, the teeth of the gear 136 merely slipping through the teeth of the worm 135.

The knife 185 is carried in an angularly adjustable bracket 170. A finger or lug 188 that projects from the knife bracket 170 is yieldingly engaged by a dog 17 through the action of a spring 189. The spring thus tends to maintain the lug 188 in engagement with a limiting stop 190. The position of the stop 190 may be adjusted by an adjusting screw 191 that is tapped in the head 22 of the machine and that engages a shoulder 192 of the stop 190. Adjustment of the screw 191 will therefore result in rotatably adjusting the angular position of the knife bracket 170 and the knife 185 that is mounted thereon, the spring 189 acting always to maintain the lug 188 in engagement with the adjustable stop 190.

The feed disk 143 is caused to tilt yieldingly about an axis transverse to the feed-disk shaft, resulting in very sensitive response to abnormal conditions. The feed-disk shaft 137 is rigidly clamped against longitudinal movement by nuts shown at the top of the shaft in Fig. 1, the customary axially-yielding-permitting spring being omitted. The nuts permit adjusting the feed-disk shaft longitudinally to adjust the position of the feed disk.

The feed disk 143 is mounted at the lower end of the feed-disk shaft 137 through the medium of a threaded screw 144 that is threaded into a correspondingly threaded bore provided in the lower end of the shaft 137. The feed disk is adapted to tilt or pivot about the head 18 of the screw 144, in the direction of the arrow, Fig. 1, towards the knife 185 and away from the feed roll 95. In order that this tilting or pivotal movement may be as frictionless as possible, the head 18 of the screw 144 is ball-shaped, and the walls of the chamber 19 within which it is confined are shaped to correspond. For convenience of assembly, these walls are formed at 23 on the feed disk and on separable plates 24 that are secured to the feed disk, with the ball head 18 between them, by screws 29. Lugs 31 projecting from the ball head 18 engage the walls of suitable recesses in the plates 24 to cause the feed disk to rotate with the shaft 137 upon which it is mounted.

A plunger 33 is forced by a spring 37 into engagement with the feed disk to oppose yieldingly the tilting movement of the feed disk and to maintain the feed disk at right angles to its shaft. The force of the spring 37 may be adjusted by a collar 41 that is threadedly adjustable upon threads 57 that are integrally provided upon the bearing 140. The plunger 33 is mounted in a split collar 142 that is clamped to the lower portion of the bearing 140, below the threads 57. A key 145 provided upon the said lower portion of the bearing 140 is seated in a corresponding groove of the clamp 142 to prevent accidental rotation of the clamp 142, thus determining the point on the feed roll 95 at which the feed disk 143 shall tilt. The clamp 142 is slantingly cut away at 221 to permit the feed disk to tilt.

The foregoing brief description of the machine of the aforementioned application will suffice as a setting for the features of novelty that are now to be explained, and it will be understood that the said features of novelty are not restricted to any particular machine, the machine of the said application being chosen for illustrative purposes only, to make clearer the description that is now to follow.

A chief object of the present invention is to provide an improved adjustment for the feed disk. The improved adjustment is neither exactly transverse, nor exactly longitudinal, but a combination of both, in order to permit accommodating the feed disk 143 to the various adjustments for which the feed roll 95 is adapted, as is more fully described in the aforesaid application. The combined adjustment is further advantageous in connection with the pivotally yielding feed disk above described.

To the attainment of this end, the feed-disk bearing 140 is pivoted at 223 to the lower end 225 of a rod 227. The rod 227 is longitudinally adjustable in the head 22 of the frame of the machine to permit vertical adjustment of the pivotal point 223. Once adjusted, however, the pivotal point 223 is fixed, and the bearing 140 is pivotally adjustable about this now temporarily fixed point 223. Vertical adjustment of the pivotal point 223 in the longitudinal direction of the rod 227 may be effected in many ways without departing from the spirit or scope of the present invention. According to the preferred construction, the upper end of the rod 227 is threaded, as shown at 229, and is provided with a nut 231 that engages the head 22 of the machine frame at 233. Rotation of the nut 231 will therefore result in raising or lowering the rod 227, according to the direction of rotation of the nut. A spring 235 that is coiled about the rod between a projection 237 at the lower end of the rod and the fixed portion 239 of the head 22 of the machine frame takes up the lost motion and serves as a yielding mounting for the bearing 140 upon the head 22 of the machine frame.

The head 22 of the machine frame is provided with a lug 241 having a cylindrical recess 243 in which is disposed a cylindrical adjusting gear 245. The cylindrical recess is cut away at 247 parallel to the axis of the cylinder, and the gear 245 extends beyond the cut-away portion, into meshing engagement with a rack 249 that is provided upon the feed-disk-carrying bearing 140. By turning the gear 245, as by means of a thumb nut 251 that is integral therewith, therefore, the bearing 140 will be moved about its pivotal point 223, thereby carrying the feed disk 143 with a combined movement in a vertical plane substantially parallel to the axis of the feed roll towards or away from the feed roll 95 and the knife 185 longitudinally of the feed roll and the knife, and towards and away from the feed roll and the knife transverse to the feed roll and the knife. During this movement, the teeth of the gears 135 and 136 slip through each other without unmeshing.

After the desired pivotal adjustment of the feed disk 143 has been effected, the bearing 140 may be fixed in adjusted position by a clamp nut 253. The clamp nut 253 is threaded upon the threaded end 255 of a rod 257 the other end 359 of which is threaded or otherwise fixed in the lug 241 of the head 22. The nut 253 engages a washer 361 that is interposed about the rod 257 between the nut 253 and the bearing 140. The bearing 140 is in this manner caused to be clamped to the lug 241. The rod 257 extends through communicating openings 259 and 261 in the bearing 140. The opening 259 is cylindrical, and the opening 261 is narrow, but elongated. This construction prevents binding of the parts during the above-described pivotal adjustment of the bearing 140. A spring 263 that is coiled about the rod 257 in the opening 259 bears against the end wall 265 of the opening 259 and against the washer 361. The nut 253 is therefore adapted to be tightened in opposition to the force of the spring 263. The feed-disk-carrying bearing 140 may therefore be yieldingly clamped against the lug 241 with any desired degree of tightness. In conjunction with the spring 235, the spring 263 acts to permit the bearing to yieldingly resist shocks, jars and the like upon the machinery.

Some provision should preferably be made for holding the adjusting gear 245 in the cylindrical opening 243. According to the preferred construction, the inner end of the adjusting gear 245 is provided with an annular recess 267. A button 269 extends into the recess 267. Longitudinal movement of the adjusting gear 245 is therefore prevented without in any way interfering with its rotation. To remove the adjusting gear 245, all that is necessary is to take the button 269 out of the annular recess 267. To facilitate this function, the button 269 is provided upon a plate 271 that is provided with an opening 273 through which the rod 257 extends. To remove the plate, all that is necessary is to remove the nut 253 and the bearing 140, after which the plate 271 may be slipped off the rod 257. In practice, when it is desired to take the adjusting gear 245 out of its cylindrical recess 243, it is sufficient to unclamp the nut 253 sufficiently to make the plate 271 loose.

The description of many portions of the machine an understanding of which is not essential to an understanding of the present invention has purposely been omitted, and many parts of the machine have purposely not been illustrated in order not to distract the attention from the features of essential novelty. Fuller explanation of such portions of the machine will be found in the copending application referred to above. It will be clear that the features of novelty may be embodied in other machines, and in machines of other types, and that modifications may be made therein by persons skilled in the art, without departing from the spirit and scope of the invention, as defined in the appended claims.

What is claimed is:

1. A machine of the class described having, in combination, a knife, a feed roll and a feed disk for feeding material to the knife, the feed disk being adjustable with a combined longitudinal and transverse movement in a plane through the axis of the feed disk substantially parallel to the axis of the feed roll, and means for adjusting the feed disk with a combined longitudinal and transverse movement in the said plane.

2. A machine of the class described having, in combination, a knife, a feed roll and a feed disk for feeding material to the knife, the feed disk being pivotally adjustable in a plane through the axis of the feed disk substantially parallel to the axis of the feed roll, and means for pivotally adjusting the feed disk in the said plane.

3. A machine of the class described having, in combination, a knife, a feed roll and a feed disk for feeding material to the knife, and means for adjusting the feed disk towards and from the feed roll with a combined movement towards or away from the feed roll longitudinally of the feed roll and towards and away from the feed roll transverse to the feed roll in a plane through the axis of the feed disk substantially parallel to the axis of the feed roll.

4. A machine of the class described having, in combination, a knife, a feed roll and a feed disk for feeding material to the knife, the feed disk being adjustable with a combined longitudinal and transverse movement in a plane through the axis of the feed disk substantially parallel to the axis of the feed roll, means for adjusting the feed disk with a combined longitudinal and transverse movement in the said plane, and means for clamping the feed disk in adjusted position.

5. A machine of the class described having, in combination, a knife, a feed roll and a feed disk for feeding material to the knife, and means for adjusting the feed disk with a combined longitudinal and transverse movement, the feed disk having a shaft and being adapted to tilt yieldingly about an axis transverse to the shaft.

6. A skiving machine having, in combination, a knife for skiving the margin of sheet material, a feed roll and a feed disk for feeding material to the knife, the feed disk having a shaft, a bearing for the shaft pivotally adjustable in a plane through the axis of the feed disk substantially parallel to the axis of the feed roll and means for pivotally adjusting the bearing in the said plane.

7. A skiving machine having, in combination, a knife for skiving the margin of sheet material, a feed roll and a feed disk for feeding material to the knife, the feed disk having a shaft, a bearing for the shaft having a rack, and a gear having teeth meshing with the teeth of the rack.

8. A skiving machine having, in combination, a knife for skiving the margin of sheet material, a feed roll and a feed disk for feeding material to the knife, the feed disk having a shaft, a bearing for the shaft pivotally adjustable in a plane through the axis of the feed disk substantially parallel to the axis of the feed roll, the bearing having an opening, means for pivotally adjusting the bearing in the said plane, and means extending through the opening for clamping the bearing in adjusted position.

9. A skiving machine having, in combination, a frame, a knife for skiving the margin of sheet material mounted on the frame, a feed roll and a feed disk for feeding material to the knife, the feed disk having a shaft, a bearing for the shaft, means for adjusting the bearing, and means for yieldingly clamping the bearing to the frame.

10. A skiving machine having, in combination, a frame, a knife for skiving the margin of sheet material mounted on the frame, a feed roll and a feed disk for feeding material to the knife, the feed disk having a shaft, a bearing for the shaft, means for yieldingly mounting the bearing upon the frame, and means for yieldingly clamping the bearing to the frame.

11. A skiving machine having, in combination, a frame, a knife for skiving the margin of sheet material mounted on the frame, a feed roll and a feed disk for feeding material to the knife, the feed disk having a shaft, a bearing for the shaft, a rod adjustably mounted on the frame to which the bearing is pivoted, means for maintaining the rod yieldingly in adjusted position, means for pivotally adjusting the bearing about the pivotal point of the rod, and means for clamping the bearing in adjusted position to the frame.

12. A skiving machine having, in combination, a frame, a knife for skiving the margin of sheet material mounted on the frame, a feed roll and a feed disk for feeding material to the knife, the feed disk having a shaft, a bearing for the shaft having a rack, an adjusting gear having teeth meshing with the teeth of the rack for adjusting the bearing, and means for clamping the bearing in adjusted position.

13. A skiving machine having, in combination, a frame, a knife for skiving the margin of sheet material mounted on the frame, a feed roll and a feed disk for feeding material to the knife, the feed disk having a shaft, a bearing for the shaft having a rack, an adjusting gear mounted on the frame having teeth meshing with the teeth of the rack for adjusting the bearing, and means for holding the gear against longitudinal displacement on the frame and permitting rotatable adjustment of the gear.

14. A skiving machine having, in combination, a frame, a knife for skiving the margin of sheet material mounted on the frame, a feed roll and a feed disk for feeding material to the knife, the feed disk having a shaft, a bearing for the shaft having a rack, an adjusting gear mounted on the frame having teeth meshing with the teeth of the rack for adjusting the bearing, means for holding the gear against longitudinal displacement on the frame and permitting rotatable adjustment of the gear, and common means for securing the gear-holding means and clamping the bearing in adjusted position.

15. A machine of the class described having, in combination, a frame, a gear having an annular recess mounted on the frame, a plate having a button mounted in the recess, whereby longitudinal movement of the gear is prevented while permitting rotary movement of the gear, a member maintained in contact with the plate, and means extending through the member and the plate for securing the plate and clamping the member to the frame.

16. A skiving machine having, in combination, a frame having a cylindrical opening, a knife for skiving the margin of sheet material mounted on the frame, a feed roll and a feed disk for feeding material to the knife, the feed disk having a shaft, a bearing for the shaft having a rack, an adjusting gear mounted in the cylindrical opening having teeth meshing with the teeth of the rack for adjusting the bearing, the gear having an annular recess, a button mounted in the recess, whereby longitudinal movement of the gear is prevented while permitting rotary movement of the gear, and means for clamping the bearing in adjusted position and securing the button in the recess.

17. A skiving machine having, in combination, a frame having a cylindrical opening, a knife for skiving the margin of sheet material mounted on the frame, a feed roll and a feed disk for feeding material to the knife, the feed disk having a shaft, a bearing for the shaft having a rack, and an opening, a rod adjustably mounted on the frame to which the bearing is pivoted, means for maintaining the rod yieldingly in adjusted position, an adjusting gear mounted in the cylindrical opening having teeth meshing with the teeth of the rack for pivotally adjusting the bearing about the pivotal point of the rod, the gear having an annular recess, a plate having a button mounted in the recess and having an opening, whereby longitudinal movement of the gear is prevented while permitting rotary movement of the gear, a threaded rod extending through the openings in the bearing and the plate, a coil spring surrounding the threaded rod, and a nut threaded upon the threads of the rod and adapted to be tightened in opposition to the force of the spring for securing the plate and yieldingly clamping the bearing to the frame.

In testimony whereof, I have hereunto subscribed my name this 28th day of December, 1923.

ANDREW R. RIDDERSTROM.